(12) United States Patent
Böhm et al.

(10) Patent No.: US 6,224,264 B1
(45) Date of Patent: May 1, 2001

(54) GUIDE BUSH AND ADJUSTABLE LENGTH COLUMN WITH GUIDE BUSH

(75) Inventors: Fred Böhm, Naila; Frank Weisser, Pegnitz; Peter Lang, Heinersreuth; Walter Böhm, Feucht, all of (DE)

(73) Assignee: SUSPA Holding GmbH, Altdorf (DE)

( * ) Notice: Subject to any disclaimer, the term of this patent is extended or adjusted under 35 U.S.C. 154(b) by 0 days.

(21) Appl. No.: 09/168,674

(22) Filed: Oct. 9, 1998

(30) Foreign Application Priority Data

Oct. 16, 1997 (DE) .............................. 197 45 711
Sep. 19, 1998 (DE) .............................. 198 42 957

(51) Int. Cl.⁷ .................................................. F16C 17/02
(52) U.S. Cl. ............................................ 384/220; 384/220
(58) Field of Search ..................... 384/215, 220, 384/217, 536, 582

(56) References Cited

U.S. PATENT DOCUMENTS

| | | |
|---|---|---|
| 4,899,969 | 2/1990 | Bauer et al. . |
| 5,152,646 | 10/1992 | Bauer . |
| 5,161,786 | 11/1992 | Cohen . |
| 5,496,115 | 3/1996 | Bauer . |
| 5,556,170 | 9/1996 | Lai et al. . |

FOREIGN PATENT DOCUMENTS 197 13 035 * 10/1998 (DE) .
0 591 901 * 5/1994 (EP) .

* cited by examiner

Primary Examiner—Lenard A. Footland
(74) Attorney, Agent, or Firm—Browdy and Neimark

(57) ABSTRACT

A guide bush for an adjustable length column for chairs, tables or the like is provided, in its inner portion, with a slide bush concentric of a central longitudinal axis for the guidance of a cylindrical housing of a gas spring. The outside wall of the slide bush is provided with spaced ribs for the reception and support, radial to the axis, in an upright tube of the column. The ribs are elastically deformable radially to the central longitudinal axis.

28 Claims, 4 Drawing Sheets

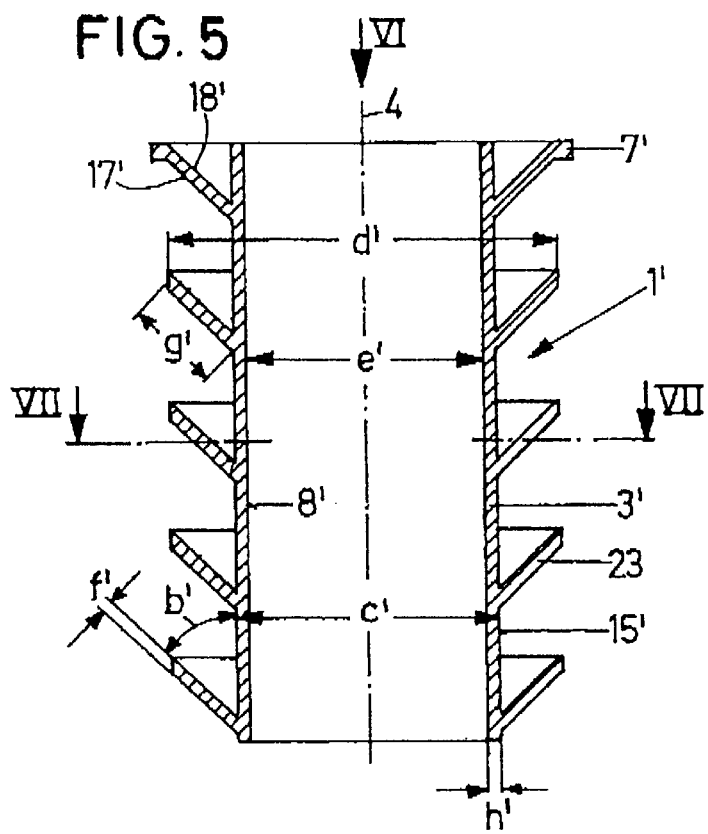
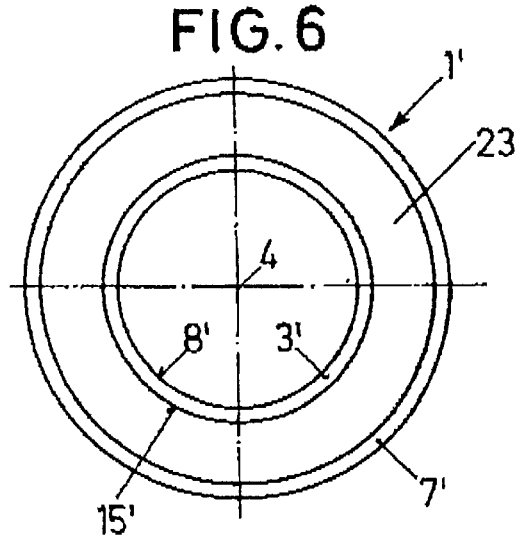
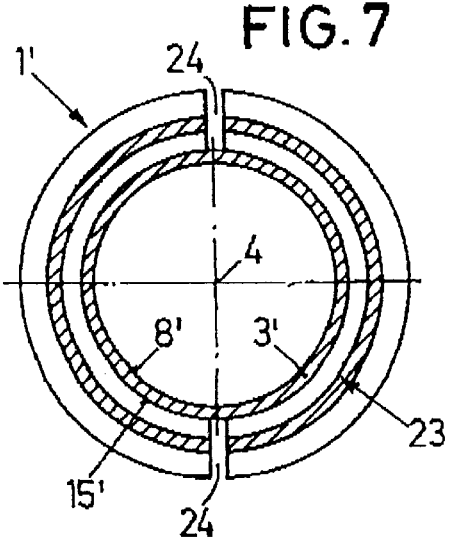

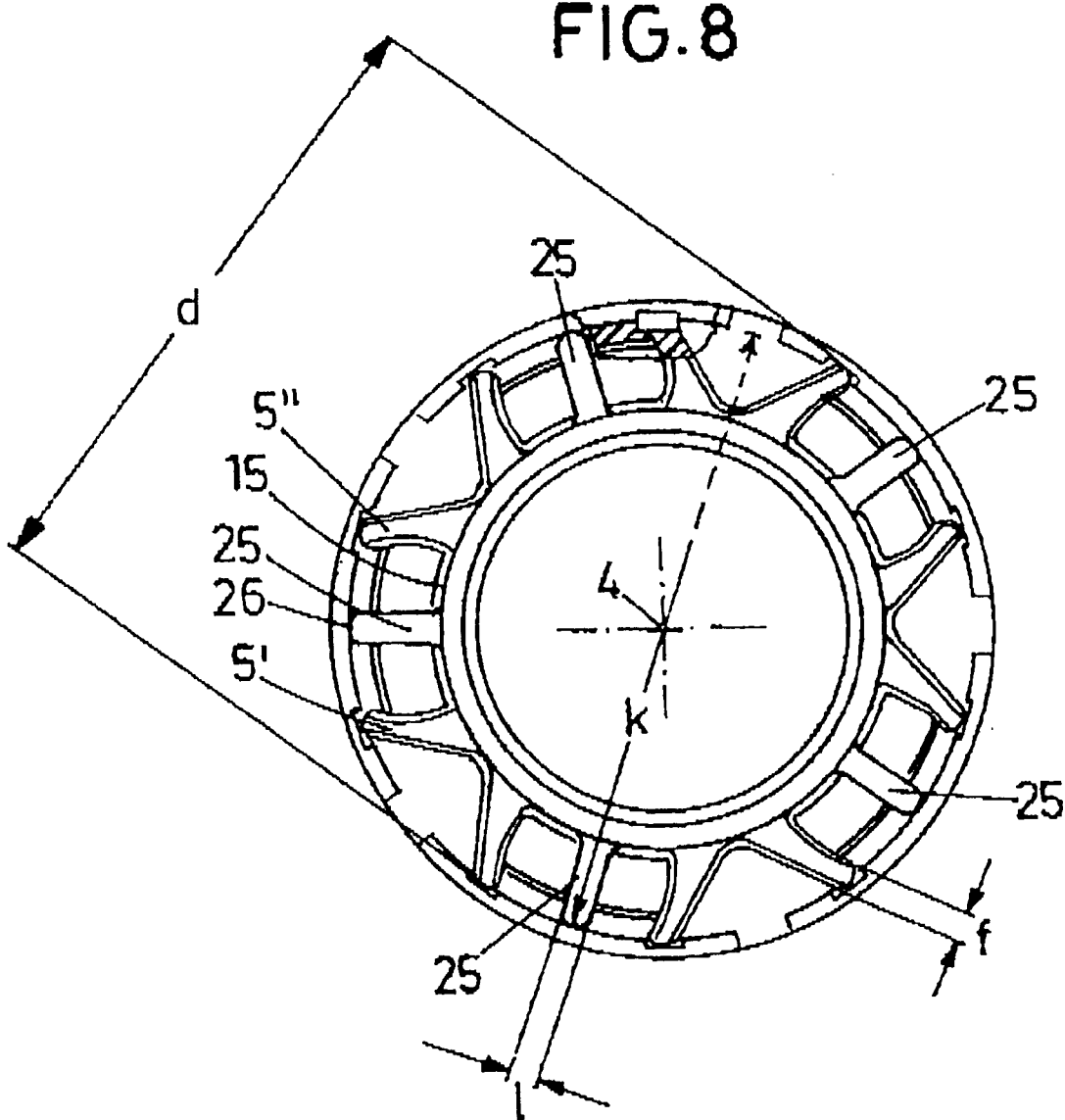

GUIDE BUSH AND ADJUSTABLE LENGTH COLUMN WITH GUIDE BUSH

BACKGROUND OF THE INVENTION

1. Field of the Invention

The invention relates to a guide bush for an adjustable length column for chairs, tables or the like, which, in its inner portion, is provided with a slide bush concentric of a central longitudinal axis for the guidance of a cylindrical housing of an adjusting element, the outside wall of the slide bush being provided with spaced ribs for the reception and support, radial to the axis, in an upright tube of the column, and to an adjustable length column comprising a guide bush of this type.

2. Background Art

A guide bush of the generic type and a column of the generic type are known from U.S. Pat. No. 5,496,115. On the inside circumference of its slide bush, this known guide bush comprises narrow guide ribs for the guidance of the housing of an adjusting element, in particular an adjustable length gas spring. Web-like ribs are formed on the outside circumference of the slide bush, extending precisely radially to the common central longitudinal axis and supporting the slide bush to be rigid and immovable radially to the central longitudinal axis in the upright tube of the column. The web-like ribs combine with the slide bush to be very rigid so that no inadvertent radial motions of the housing of the adjustable length element are possible.

Any direct compensation of tolerances of the inside diameter of the upright tube is not possible in this way.

In as much as the design of the web-like ribs and the support, in this regard rigid radially to the central longitudinal axis, of the slide bush in an upright tube are concerned, comparable solutions are known from U.S. Pat. No. 5,152,646 and U.S. Pat. No. 4,899,969.

U.S. Pat. No. 5,161,786 teaches an upright tube of plastic material which is embodied to replace an upright tube of metal. It comprises rigid web-like ribs on its inner surface which extend over the full length thereof radially to the central longitudinal axis and the inside end of which is provided with flexible support projections which combine to constitute a floating support ring, this ensuring lateral motions of the housing of an adjustable length element in the vicinity of the upper end of the column. These support projections have the double function of resiliently guiding the adjustable length element and of simultaneously offering sufficient rigidity to loads. Since the upright tube, the radial web-like ribs and the support projections formed on the latter all constitute a single piece of plastic material, the problem of compensation of tolerances of the inside diameter of the upright tube does not pose itself.

SUMMARY OF THE INVENTION

It is the object of the invention to embody a guide bush of the generic type and a column of the generic type such that any tolerances of the inside diameter of the upright tube, which is separate from the guide bush, can be compensated.

In a guide bush of the generic type and in a column of the generic type, this object is attained by the ribs being elastically deformable radially to the central longitudinal axis. The gist of the invention resides in that the slide bush, rigid as such, of the guide bush is mounted and supported in the up-right tube elastically flexibly in the radial direction related to the central longitudinal axis. This helps compensate tolerances of the inside diameter of the upright tubes.

Further, also the guide bush inserted in an upright tube may yield radially to a certain extent, which enables misalignments to be compensated between the central longitudinal axis of the upright tube and the inserted adjusting element, i.e. regularly the adjustable length gas spring.

Further features, advantages and details of the invention will become apparent from the ensuing description of exemplary embodiments, taken in conjunction with the drawing.

BRIEF DESCRIPTION OF THE DRAWING

FIG. 5 is another embodiment of a guide bush;

FIG. 6 is a plan view of the guide bush according to the arrow VI of FIG. 5;

FIG. 7 is a section through the guide bush on the section line VII—VII of FIG. 5; and FIG. 8 is a plan view, according to the arrow III of FIG. 2, of the guide bush in a modification of the exemplary embodiment according to FIGS. 2 to 4.

DESCRIPTION OF THE PREFERRED EMBODIMENTS

Figure 1:
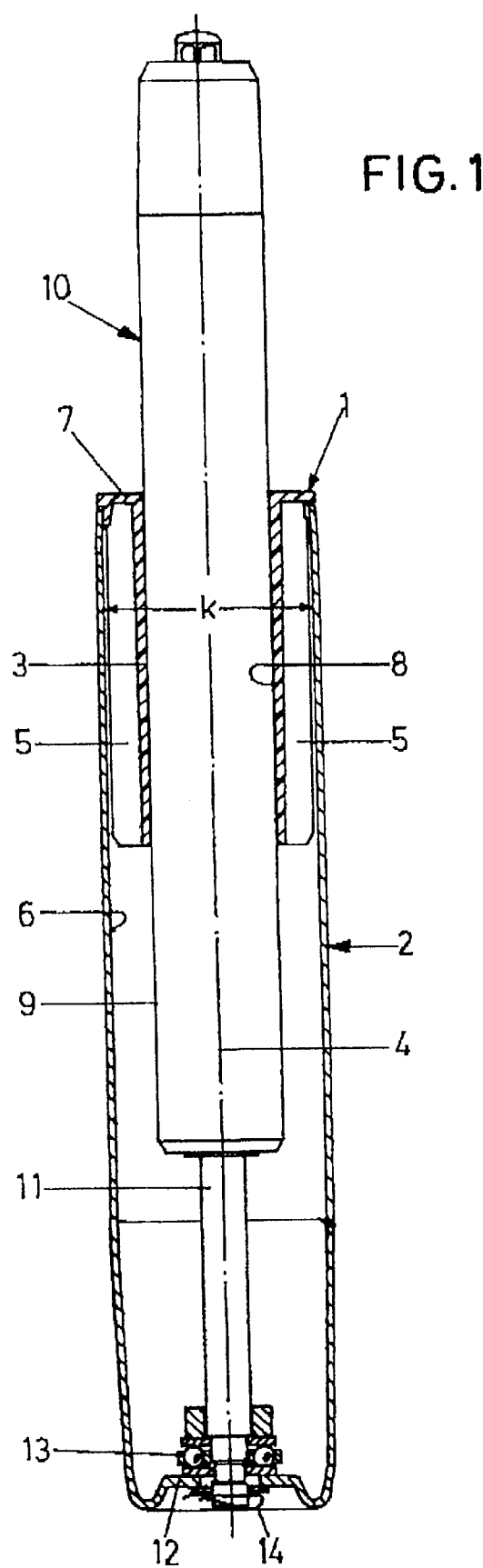
FIG. 1 is a partial section through an adjustable height chair column having an upright tube, a guide bush and a gas spring.

A guide bush 1 is disposed in an upright tube 2 of steel of an adjustable height chair column. Chair columns of the generic type are known for instance from U.S. Pat. No. 4,969,619, to which reference is made explicitly.

The guide bush 1, which extends maximally over half the length of the upright tube 2, possesses an inner slide bush 3, on the outside of which ribs are molded, which are formed as web-like ribs 5', 5" and project outwards radially to the common central longitudinal axis 4 and run parallel to the axis 4. By the aid of these web-like ribs 5', 5", the guide bush 1, which is separate from the upright tube 2, supports itself radially on the inside wall 6 of the upright tube 2. An upper annular collar 7 fixes the guide bush 1 in the axial direction relative to the upright tube 2. The guide bush 1 is inserted in the upright tube 2 by press-fit, the web-like ribs 5 being deformed elastically by bending.

A housing 9 of a roughly outlined, adjustable length gas spring 10 is guided on the inner surface 8 of the slide bush 3 for displacement in the direction of the axis 4. Concentrically of the axis 4, a piston rod 11 of the gas spring extends downwards out of the housing 9; it is supported on a bottom plate 12 of the upright tube 2 by means of a thrust bearing 13 and fixed in the direction of the axis 4 by means of a securing clip 14. This gas spring 10 combines with the upright tube 2 and the guide bush 1 to constitute substantially the adjustable height chair column mentioned. The housing 9 of the gas spring 10 may be the latter's direct housing or an additional stay pipe surrounding the gas spring 10, as known from U.S. Pat. No. 4,899,969, to which reference is made explicitly.

The guide bush 1 consists of plastic material, preferably of a polyphenylene oxide, and is produced in a single piece by injection-molding. The inner surface 8 of the as such rigid slide bush 3 is approximately annular cylindrical, its inside diameter being adapted to the outside diameter of the cylindrical housing 9 so that the housing 9 is guided in the slide bush 3 in a manner substantially free from play radially to the axis 4, but for displacement with little friction in the direction of the axis 4.

Figure 3:
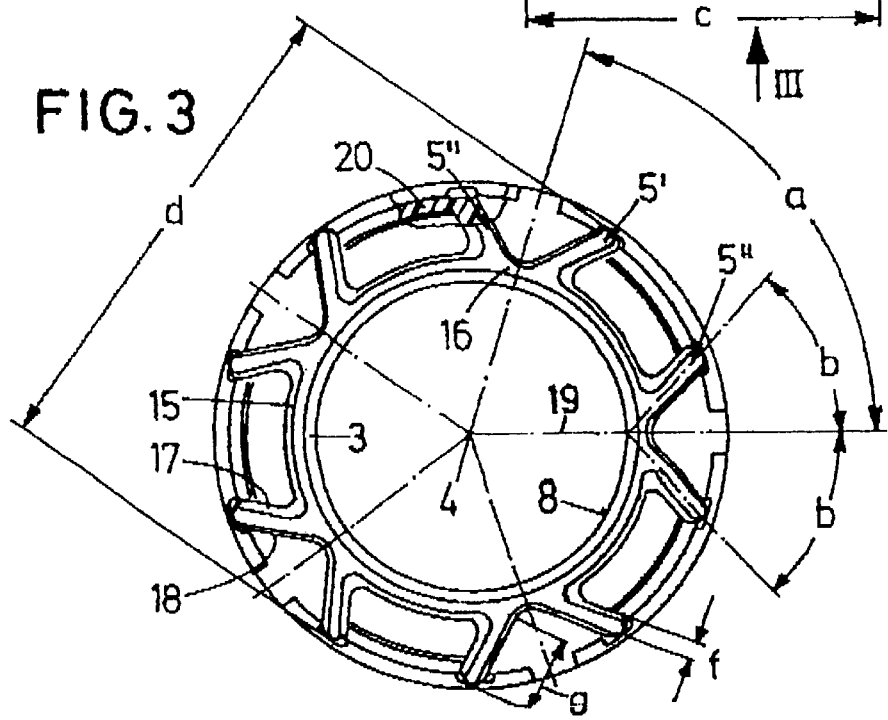
FIG. 3 is a plan view of the guide bush according to the arrow III of FIG. 2.

The web-like ribs 5', 5" formed on the outside wall 15 of the slide bush 3 are provided in pairs, the web-like ribs 5' and 5" of a pair inclining apart from the inside to the outside radially to the axis 4 in the cross-sectional view according to FIG. 3. The pairs of web-like ribs 5', 5" are disposed at identical angular distances from each other, i.e. the angle a taken by two neighboring pairs of web-like ribs 5', 5" is 72° in the case of the five pairs of web-like ribs 5', 5" illustrated in the exemplary embodiment. By their common root portion 16, the web-like ribs 5', 5" of a pair are formed on the outside wall 15 of the slide bush 3 in a single piece therewith. The web-like ribs 5', 5", which are provided with outer flanks 17 and inner flanks 18 approximately parallel to each other, exhibit an angle of inclination b relative to an axial plane 19 locating the axis 4, the angle b amounting to 38° in this exemplary embodiment and customarily ranging from 35° to 45°. As regards the ratio which the outside diameter c of the slide bush 3 bears to the outside diameter d of the web-like ribs 5, $0.6 \leq c/d \leq 0.8$, and preferably $c/d \approx 0.7$, applies. Consequently, the web-like ribs 5', 5" are comparatively long radially to the axis 4 and due to their inclination as specified, they can be bent and deformed away from each other so that they are able elastically flexibly to compensate tolerances in the inside diameter k of the upright tube 2 without the slide bush 3 being deformed. They can easily be bent elastically on the slide bush 3 towards the latter's outside wall 15. Their thickness f ranges from 1 to 3 mm, given a length g of the outside wall 15 of the slide bush 3 in the range of 5.5 to 13.5 mm, which is at least twice the thickness f.

The web-like ribs 5', 5" of each pair of web-like ribs 5', 5" and the annular collar 7 are one-piece, the ribs being partially supported relative to each other on the annular collar 7 by means of a partial annular web 20 which is likewise integral with the annular collar 7. This helps avoid that the web-like ribs 5', 5" will deform too softly apart or toward the slide bush 3.

Given a customary inside diameter e of the slide bush 3 of 28 mm, the slide bush has a mean wall thickness h of 2 to 3 mm and preferably of 2.5 mm, i.e. the slide bush 3 is comparatively rigid as such.

Figure 4:
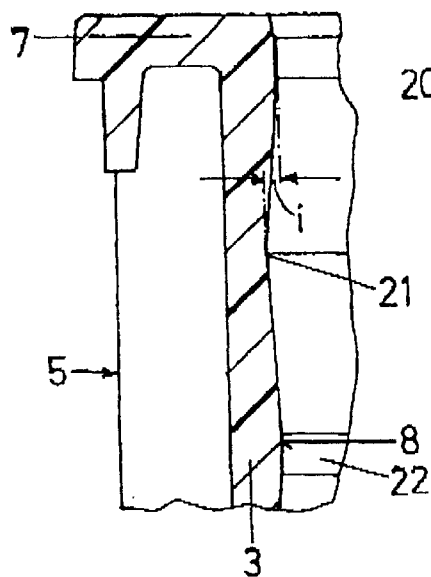
FIG. 4 is an extract, denoted by IV, from FIG. 2 on an enlarged scale.

The inner surface of the slide bush 3 is not precisely cylindrical, but has rear recesses 21 of approximately triangular cross-sectional shape according to the illustration of FIG. 4, the maximum depth i of the rear recesses being only few tenths of a millimeter, for instance 0.3 mm. Two rear recesses 21 at a time, each extending over the full circumference of the inner surface 8, are separated from each other by an annular cylindrical guide section 22 on which the housing 9 of the gas spring 10 is guided accurately. The rear recesses 21 serve as grease chambers, this ensuring on the one hand the guidance, with extremely little friction, of the housing 9 in the slide bush 3 and on the other hand the mentioned guidance of the gas spring 10 substantially free from play radial to the axis 4.

In a condition of the guide bush not inserted in an upright tube, i.e. in the non-deformed condition of the web-like ribs 5, the outside diameter d of the web-like ribs 5 will always slightly exceed the greatest possible inside diameter k of the upright tube 2 so that the mentioned firm, but still slightly elastically flexible fit of the guide bush 1 in the upright tube 2 is ensured. $0.1 \text{ mm} \leq (d-k) \leq 0.3 \text{ mm}$ applies.

In the embodiment according to FIGS. 5 and 6, the guide bush 1' has a slide bush 3', on the outside wall 15' of which ribs 23 are formed, which project radially to the central longitudinal axis 4 and are moreover inclined in the direction towards the central longitudinal axis 4. They have the overall shape of a truncated cone opening upwards. An annular collar 7' is formed on the upper encircling rib 23 to take its bearing on the upright tube 2. As seen in FIG. 6, these ribs 23 can be formed without interruption, i.e. they can be continuous over an angle at circumference of 360° relative to the central longitudinal axis 4, or—according to the illustration of FIG. 7—they can be segmented by one or several slits 24 which extend radially to the axis 4. The elasticity of the ribs 23 in the direction of the axis 4 and thus also radially to the axis 4 is increased by means of these slits 24, i.e. by corresponding segmentation. Otherwise the above description also applies to this design of the ribs 23. In FIGS. 5 to 7 identical parts have the same reference numerals as in the embodiment according to FIGS. 1 to 4, however provided with a prime, there being no need of renewed description.

Figure 2:
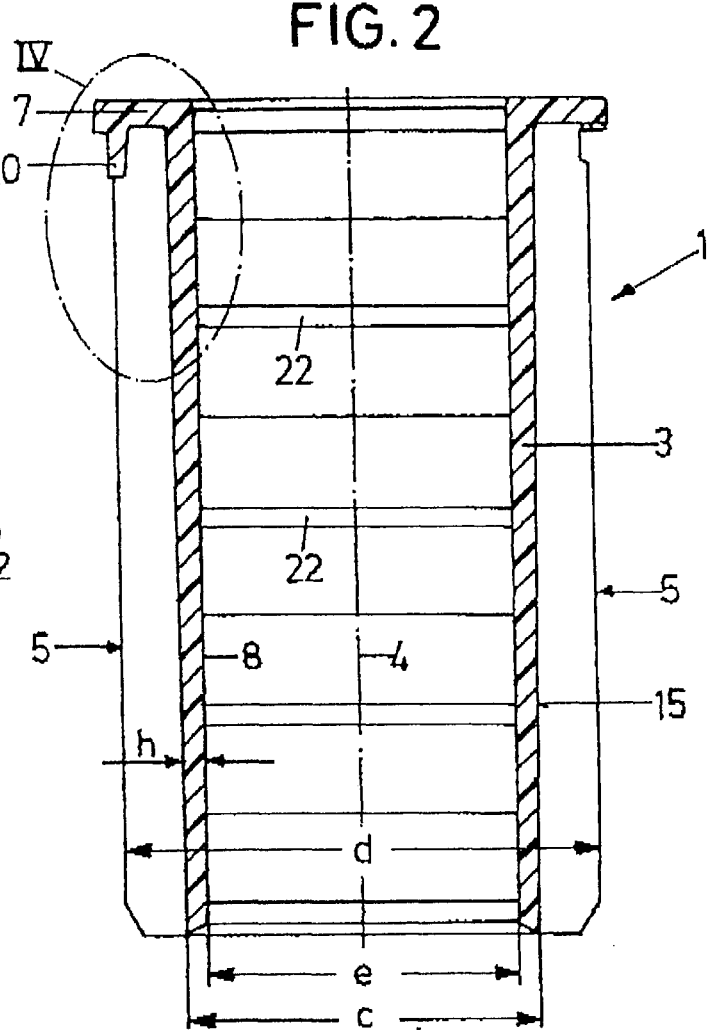
FIG. 2 is a lengthwise section of the guide bush.

As seen in FIG. 8, in the guide bush 1 according to FIGS. 2 to 4 provision can be made for limiting webs 25 which also run parallel to the axis 4 and which are disposed on the outside wall 15 of the guide bush 1, forming a single piece therewith. According to FIG. 8, limiting webs 25 of this type can be disposed centrally between two neighboring pairs of web-like ribs 5', 5" disposed in the shape of a V one relative to the other. The limiting webs 25 are radial to the axis 4 and, by contrast to the web-like ribs 5', 5", they cannot be elastically deformed radially. The outside diameter k of the limiting webs 25 is slightly smaller than the outside diameter d of the web-like ribs 5 and 5', 5". $0.4 \text{ mm} \leq (d-k) \leq 0.8 \text{ mm}$ applies. As to the thickness l of the limiting webs 25, $2.0 \text{ mm} \leq 1 \leq 3.0 \text{ mm}$ applies. As can further be seen in FIG. 8, $1.0 \leq 1/f \leq 2.0$ applies to the ratio which the thickness 1 of the limiting web 25 bears to the thickness f of the web-like ribs 5', 5".

It is the object of the limiting webs 25 to define the deformation of the web-like ribs 5, 5' radial to the axis 4 so that the support of the guide bush 1 in the upright tube does not become too soft. The web-like ribs 5, 5' can deform as far as for the radially external stop surface 26 of the limiting webs 25 to bear against the inside wall 6 of the upright tube 2. To this end it is suitable if the stop surface 26 substantially forms a partial cylindrical surface of the diameter k so that it bears against the inside wall 6 of the upright tube 2 over its full surface and not only by line contact.

What is claimed is:

1. A guide bush (1;1') for an adjustment length column for chairs, which, in an inner portion, is provided with a slide bush (3;3') concentric of a central longitudinal axis (4) of the guidance of a cylindrical housing (9) of an adjusting element (10), an outside wall (15;15') of the slide bush (3,3') being provided with spaced ribs (5) for the reception and support, radial to the axis (4), in an upright tube (2) of the column, wherein the ribs (5) are elastically deformable radially to the central longitudinal axis (4), and wherein limiting webs (25) are formed on the side wall (15) of the slide bush (3), which are radial to the axis (4) and the outside diameter k of which is slightly smaller than the outside diameter d of the ribs (5).

2. A guide bush according to claim 1, wherein the ribs (5) have an extension g; g' from the outside wall (15; 15') of the slide bush (3; 3') outwards radially to the central longitudinal axis (4) which is at least twice the thickness f; f' of the ribs (5).

3. A guide bush according to claim 1, wherein the webs are pairs of web-like ribs (5', 5") are disposed at equal angular distances relative to the central longitudinal axis(4).

4. A guide bush according to claim 1, wherein by a common root portion (16), the rib which are web-like ribs (5', 5") of each pair of web-like ribs (5', 5") are formed on the outside wall (15) of the slide bush (3) in a single piece with the slide bush (3).

5. A guide bush according to claim 1, wherein the ribs which are web-like ribs (5', 5") of each pair of web-like ribs (5', 5" are disposed symmetrically to an axial plane (19) which locates the central longitudinal axis (4).

6. A guide bush according to claim 1, wherein the ribs are web-like ribs (5'–5") and are disposed in pairs, inclining apart seen from an inside to an outside radially to the central longitudinal axis (4).

7. A guide bush according to claim 1, wherein the ribs (5) have outer flanks (17) and inner flakes (18) approximately parallel to each other.

8. An adjustable length column for chairs, comprising a guide bush (1;1'), which, in an inner portion, is provided with a slide bush (3;3') concentric of a central longitudinal axis (4) for the guidance of a cylindrical housing (9) of an adjusting element (10), an outside wall (15;15') of the slide bush (3,3') being provided with spaced ribs (5) for the reception and support, radial to the axis (4), in an upright tube (2) of the column, wherein the ribs (5) are elastically deformable radially to the central longitudinal axis (4),
wherein the ribs are web-like ribs (5',5") and are disposed in pairs, inclining apart seen from an outside radially to the central longitudinal axis (4).

9. An adjustable length column according to claim 8, wherein the pairs of web-like ribs (5',5") are disposed at equal angular distance a relative to the central longitudinal axis (4).

10. An adjustable length column according to claim 8, wherein the web-like ribs (5',5") of each pair of web-like ribs (5',5") are disposed symmetrically to an axial plane (19) which locates the central longitudinal axis (4).

11. An adjustable length column according to claim 8, wherein the ribs (5) have an extension g;g' from the outside wall (15;15') of the slide bush (3;3') outwards radially to the central longitudinal axis (4) which is at least twice the thickness f;f' of the ribs (5).

12. An adjustable length column according to claim 8, wherein the ribs (5) have outer flanks (17) and inner flanks (18) approximately parallel to each other.

13. An adjustable length column according to claim 8, wherein limiting webs (25) are formed on the outside wall (15) of the slide bush (3), which are radial to the axis (4) and the outside diameter k of which is slightly smaller than the outside diameter d of the ribs (5).

14. An adjustable length column according to claim 8, wherein by a common root portion (16), the web-like ribs (5'5") are formed on the outside wall (15) of the slide bush (3) in a single piece with the slide bush (3).

15. An adjustable length column for chairs, comprising a guide bush (1;1'), which, in an inner portion, is provided with a slide bush (3;3') concentric of a central longitudinal axis (4) for the guidance of a cylindrical housing (9) of an adjusting element (10), an outside wall (15;15') of the slide bush (3;3') being provided with spaced ribs (5) for the reception and support, radial to the axis (4), in an upright tube (2) of the column, wherein the ribs (5) are elastically deformable radially to the central longitudinal axis (4), and
wherein limiting webs (25 are formed on the outside wall (15) of the slide bush (3), which are radial to the axis (4) and the outside diameter k of which is slightly smaller than the outside diameter d of the ribs (5).

16. An adjustable length column according to claim 15, wherein the ribs are web-like ribs (5', 5") and are disposed in pairs, inclining apart seen from an inside to an outside radially to the central longitudinal axis (4).

17. An adjustable length column according to claim 16, wherein the pairs of web-like ribs (5', 5") are disposed at equal angular distances a relative to the central longitudinal axis (4).

18. An adjustable length column according to claim 16, wherein by a common root portion (16), the web-like ribs (5', 5") of each pair of web-like ribs (5', 5") are formed on the outside wall (15) of the slide bush (3) in a single piece with the slide bush (3).

19. An adjustable length column according to claim 16, wherein the web-like ribs (5', 5") of each pair of web-like ribs (5', 5") are disposed symmetrically to an axial plane (19) which locates the central longitudinal axis (4).

20. An adjustable length column according to claim 15, wherein the ribs (5) have outer flanks (17) and inner flanks (18) approximately parallel to each other.

21. An adjustable length column according to claim 15, wherein the ribs (5) have an extension g; g' from the outside wall (15; 15') of the slide bush (3; 3') outwards radially to the central longitudinal axis (4) which is at least twice the thickness f; f' of the ribs (5).

22. A guide bush (1;1') for an adjustable length column for chairs, which, in an inner portion, is provided with a slide bush (3;3') concentric of a central longitudinal axis (4) for the guidance of a cylindrical housing (9) of an adjusting element (10), and outside wall (15;15') of the slide bush (3,3') being provided with spaced ribs (5;23) for the reception and support, radial to the axis (4), in an upright tube (2) of the column, wherein the ribs (5) are elastically deformable radially to the central longitudinal axis (4),
wherein the ribs are web-like ribs (5',5") and are disposed in pairs, inclining apart seen from an inside to an outside radially to the central longitudinal axis (4).

23. A guide bush according to claim 22, wherein the ribs (5) have outer flanks (17) and inner flanks (18) approximately parallel to each other.

24. A guide bush according to claim 22, wherein the ribs (5;) have an extension g;g' from the outside wall (15;15') of the slide bush (3;3") outwards radially to the central longitudinal axis (4) which is at least twice the thickness f;f' of the ribs (5).

25. A guide bush according to claim 22, wherein the pairs of web-like ribs (5',5") are disposed at equal angular distances relative to the central longitudinal axis.

26. A guide bush according to claim 22, wherein by a common root portion (16), the web-like ribs (5',5") of each pair of web-like ribs (5',5") are formed on the outside wall (15) of the slide bush (3) in a single piece with the slide bush (3).

27. A guide bush according to claim 22, wherein the web-like ribs (5'5") of each pair of web-like ribs (5'5") are disposed symmetrically to an axial plane (19) which locates the central longitudinal axis (4).

28. A guide bush according to claim 22, wherein limiting webs (25) are formed on the outside wall (15) of the slide bush (3), which are radial to the axis (4) and the outside diameter k of which is slightly smaller than the outside diameter d of the ribs (5).

* * * * *